(12) United States Patent
Brueck et al.

(10) Patent No.: US 7,327,924 B2
(45) Date of Patent: Feb. 5, 2008

(54) GENERALIZED TRANSVERSE BRAGG WAVEGUIDE

(75) Inventors: Steven R. J. Brueck, Albuquerque, NM (US); David B. Burckel, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 204 days.

(21) Appl. No.: 11/231,812

(22) Filed: Sep. 22, 2005

(65) Prior Publication Data
US 2006/0062536 A1   Mar. 23, 2006

Related U.S. Application Data

(60) Provisional application No. 60/612,185, filed on Sep. 23, 2004.

(51) Int. Cl.
*G02B 6/10* (2006.01)
(52) U.S. Cl. .................. 385/129; 385/37; 385/131
(58) Field of Classification Search .............. None
See application file for complete search history.

(56) References Cited

U.S. PATENT DOCUMENTS

| | | | |
|---|---|---|---|
| 5,955,749 A | 9/1999 | Joannopoulos et al. | |
| 6,831,302 B2 | 12/2004 | Erchak et al. | |
| 7,068,903 B2 * | 6/2006 | Kittaka et al. | 385/129 |

* cited by examiner

*Primary Examiner*—Sung Pak
(74) *Attorney, Agent, or Firm*—MH2 Technology Law Group LLP

(57) ABSTRACT

According to various embodiments, the present teachings relate to Generalized Transverse Bragg Waveguides (GTBW) that can include an a dielectric core having an index of refraction $n_1$ and an optical axis. The optical waveguide can further include a media having an index of refraction $n_2$ bounding a top surface and a bottom surface of the dielectric core, wherein $n_2<n_1$. The optical waveguide can also include a first dielectric cladding bounding a first side of the dielectric core, wherein the first dielectric cladding has a first periodic spatially varying index of refraction, and a second dielectric cladding bounding a second side of the dielectric core, wherein the second dielectric cladding has a second periodic spatially varying index of refraction. The direction of the first periodic spatially varying index of refraction and the direction of the second periodic spatially varying index of refraction can be at an angle other than normal or parallel to the optical axis.

20 Claims, 10 Drawing Sheets

GENERALIZED TRANSVERSE BRAGG WAVEGUIDE

CROSS-REFERENCE TO RELATED APPLICATIONS

This application claims priority to U.S. Provisional Patent Application Ser. No. 60/612,185 filed on Sep. 23, 2004, the disclosure of which is incorporated in its entirety by reference herein.

FIELD OF THE INVENTION

The present invention relates to optical waveguides and methods for their manufacture and, more particularly, relates to Generalized Transverse Bragg Waveguides and methods for their manufacture.

BACKGROUND OF THE INVENTION

Conventional optical waveguides use one of three methods for confinement of a signal: 1) specular reflection; 2) total internal reflection; and 3) transverse Bragg reflection. As shown in FIG. 1, a metallic waveguide 100 consisting of a first mirror 120 and a second mirror 130 employs specular reflection at the waveguide boundaries in order to confine an optical signal 101 to the waveguide region. In reflection from the metallic surface, the field oscillations of the signal, such as, for example, an electromagnetic plane wave incident on a metallic surface at angle $\theta_i$ with respect to the surface normal (shown as the dotted line), act to drive conduction electrons such that they radiate. In accordance with Maxwell's equations and the boundary conditions, the form of this radiation is again a plane wave with angle $\theta_r$ with respect to the surface normal such that $\theta_i$ equals $\theta_r$. For long wavelength radiation, such as microwaves, this process occurs with very low losses making metallic waveguides practical. At optical frequencies, the intrinsic loss from a single reflection becomes non-negligible, so that metallic optical frequency waveguides are very lossy and not of practical importance.

Total internal reflection is inherently a low loss process regardless of frequency, and therefore is a common confinement mechanism used at optical frequencies. FIG. 2 depicts a slab waveguide 200 including a dielectric core 210, a first dielectric cladding 220, and a second dielectric cladding 230. In accordance with Snell's law, the tangential component of momentum is conserved when a signal 201, such as, for example, a plane wave crosses an interface between dielectrics. For incident angles beyond the critical angle, the transmitted wave cannot satisfy conservation of momentum, and therefore is not allowed. Conservation of energy is maintained by a complete transfer of incident energy to the reflected wave in the high index medium. Equating tangential components of the wave vector momentum for the incident and reflected waves, results in $\theta_r$, the angle of reflection with respect to the interface normal, being equal to $\theta_i$ just as in reflection from a metallic surface.

The third confinement mechanism uses transverse Bragg reflection as the confinement mechanism for a dielectric waveguide. FIG. 3 depicts a conventional transverse Bragg waveguide 300 including a dielectric core 310, a first cladding 320, and a second cladding 330. First cladding 320 and second cladding 330 each consist of periodic layers with alternating high and low dielectric constants. The direction of periodicity (parallel to the x-axis) of the dielectric constant (or index of refraction) is normal to the optical axis (parallel to the y-axis) of waveguide 300. The nature of Bragg reflection is such that a signal 301, such as, for example, a plane wave has an incident angle $\theta_i$ similar to a reflected angle $\theta_r$ relative to the normal to the Bragg layers responsible for the reflection. In the conventional transverse Bragg waveguide shown in FIG. 3, this implies that, in terms of confinement, the momentum transfer resulting from the Bragg scattering process is oriented normal to the waveguide axis, and $\theta_i$ equals $\theta_r$ as in the metallic and conventional dielectric waveguides discussed above.

Conventional dielectric slab waveguides, metallic parallel plate waveguides, and transverse Bragg waveguides exhibit inversion symmetry. Inversion symmetry implies that a mode reflected at an edge boundary perpendicular to the end of the waveguide is also guided. The result is that at a planar boundary perpendicular to the waveguide axis, any reflected energy is guided down the waveguide in the reverse direction. In certain applications, guiding of this reflected energy is problematic. For example, in high-gain semiconductor-optical amplifiers, these reflections constitute undesirable feedback, which can result in spurious lasing. Similarly, in fiber lasers, such guided reflections from stimulated Raman and Brillouin scattering can limit the power output of these devices and otherwise impact the spectral quality of the laser.

Thus, there is a need to overcome these and other problems of the prior art to provide optical waveguides that do not exhibit inversion symmetry.

SUMMARY OF THE INVENTION

According to various embodiments, the present teachings include an optical waveguide including a dielectric core having an index of refraction $n_1$ and an optical axis. The optical waveguide can further include a media having an index of refraction $n_2$ bounding a top surface and a bottom surface of the dielectric core, wherein $n_2 < n_1$. The optical waveguide can also include a first dielectric cladding bounding a first side of the dielectric core, wherein the first dielectric cladding has a first periodic spatially varying index of refraction, and a second dielectric cladding bounding a second side of the dielectric core, wherein the second dielectric cladding has a second periodic spatially varying index of refraction. Further, a direction of the first periodic spatially varying index of refraction and a direction of the second periodic spatially varying index of refraction can be at an angle other than normal or parallel to the optical axis.

According to various other embodiments, the present teachings include an optical waveguide optical waveguide including a dielectric core having a uniform index of refraction along an optical axis. The optical waveguide can also include a first dielectric cladding bounding a top surface of the dielectric core, wherein the first dielectric cladding has a first periodic spatially varying index of refraction, and a second dielectric cladding bounding a bottom surface of the dielectric core, wherein the second dielectric cladding has a second periodic spatially varying index of refraction. The optical waveguide can further include a third dielectric cladding bounding a first side of the dielectric core, wherein the third dielectric cladding has a third periodic spatially varying index of refraction, and a fourth dielectric cladding bounding a second side of the dielectric core, wherein the fourth dielectric cladding has a fourth periodic spatially varying index of refraction. Moreover, a direction of the first, second, third, and fourth periodic spatially varying index of refractions can be at an angle other than normal or parallel to the optical axis.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Figure 1:
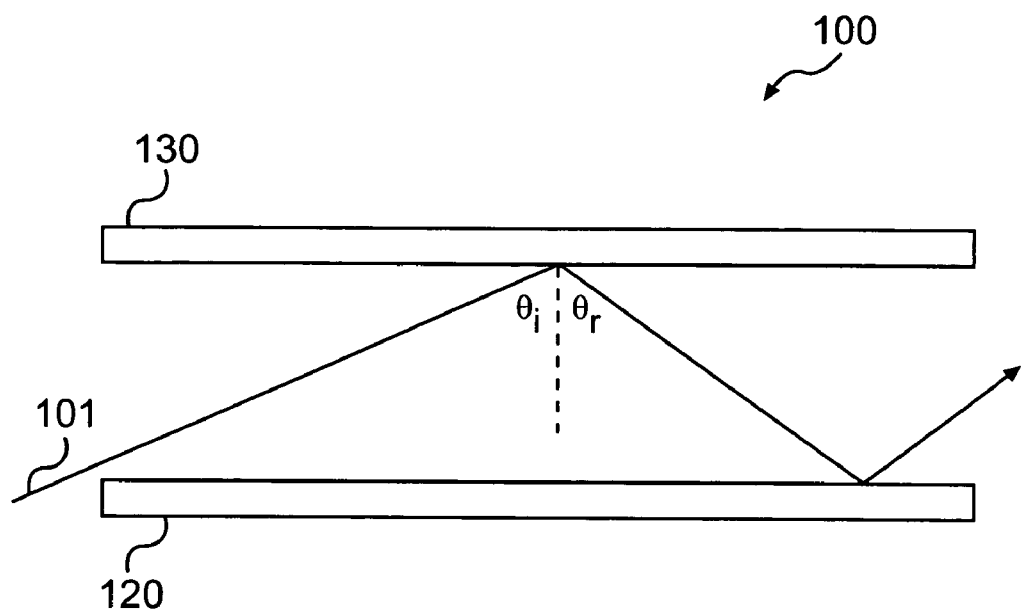
FIG. 1 depicts a prior art metallic waveguide.
Figure 2:
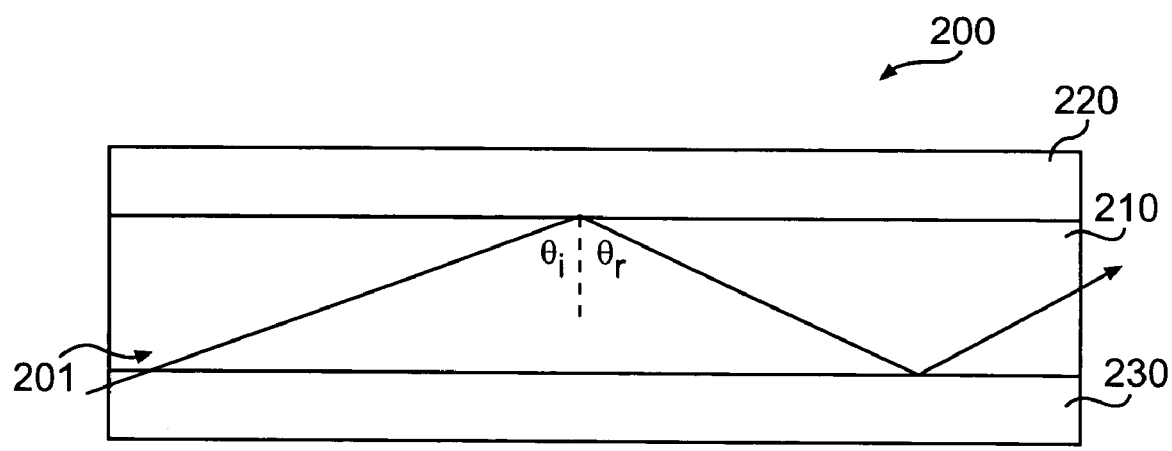
FIG. 2 depicts a prior art dielectric slab waveguide.

In the following description, reference is made to the accompanying drawings that form a part thereof, and in which are shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, not to be taken in a limited sense.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

As used herein, the term "optical axis" is used interchangeably with "waveguide axis" to indicate a direction of signal propagation through a waveguide.

As used herein, the "direction" of periodic spatial variation in the index of refraction refers to the momentum transfer associated with the Bragg scattering. For example, the direction of the periodic spatial variation in the index of refraction for isotropic optical materials is perpendicular to the layers of the Bragg grating.

As used herein, the term "signal" refers to signals of any form of electromagnetic radiation, such as, for example, optical signals and microwave signals.

Axes are shown throughout the figures solely for the purposes of illustrating the relationship between various directions of exemplary GTBWs and not to restrict the disclosed embodiments to specific orientations.

FIGS. 4-8 depict exemplary embodiments of Generalized Transverse Bragg Waveguides (GTBWs). The exemplary GTBWs can include a dielectric core, a first dielectric cladding bounding a first side of the dielectric core, wherein the first dielectric cladding has a first periodic spatially varying index of refraction, and a second dielectric cladding bounding a second side of the dielectric core, wherein the second dielectric cladding has a second periodic spatially varying index of refraction. The direction of the first periodic spatially varying index of refraction and a direction of the second periodic spatially varying index of refraction are at an angle other than normal or parallel to the optical axis.

The exemplary GTBWs can conduct light in both directions along the waveguide core. However, the conduction is not symmetric with respect to reflection about the axis perpendicular to the waveguide core. This is a result of the tilt of the claddings and the consequent lack of in-plane inversion symmetry. So, although the GTBWs can transmit light in both directions in guided modes, reflections from a perpendicular planar interface (facet) are not guided. Moreover, exemplary GTBWs can operate in single mode. For example, in high power semiconductor laser applications, high mode volume is desirable to achieve more power. Further, by tilting the Bragg planes responsible for confinement to the waveguide, an additional degree of freedom is provided for adjusting the propagation characteristics of the guided mode. Enhanced dispersion tunability can impact wavelength division multiplexing (WDM) applications for dispersion compensation, as well as phase matching in nonlinear optics applications such as second harmonic generation (SHG).

Figure 4A:
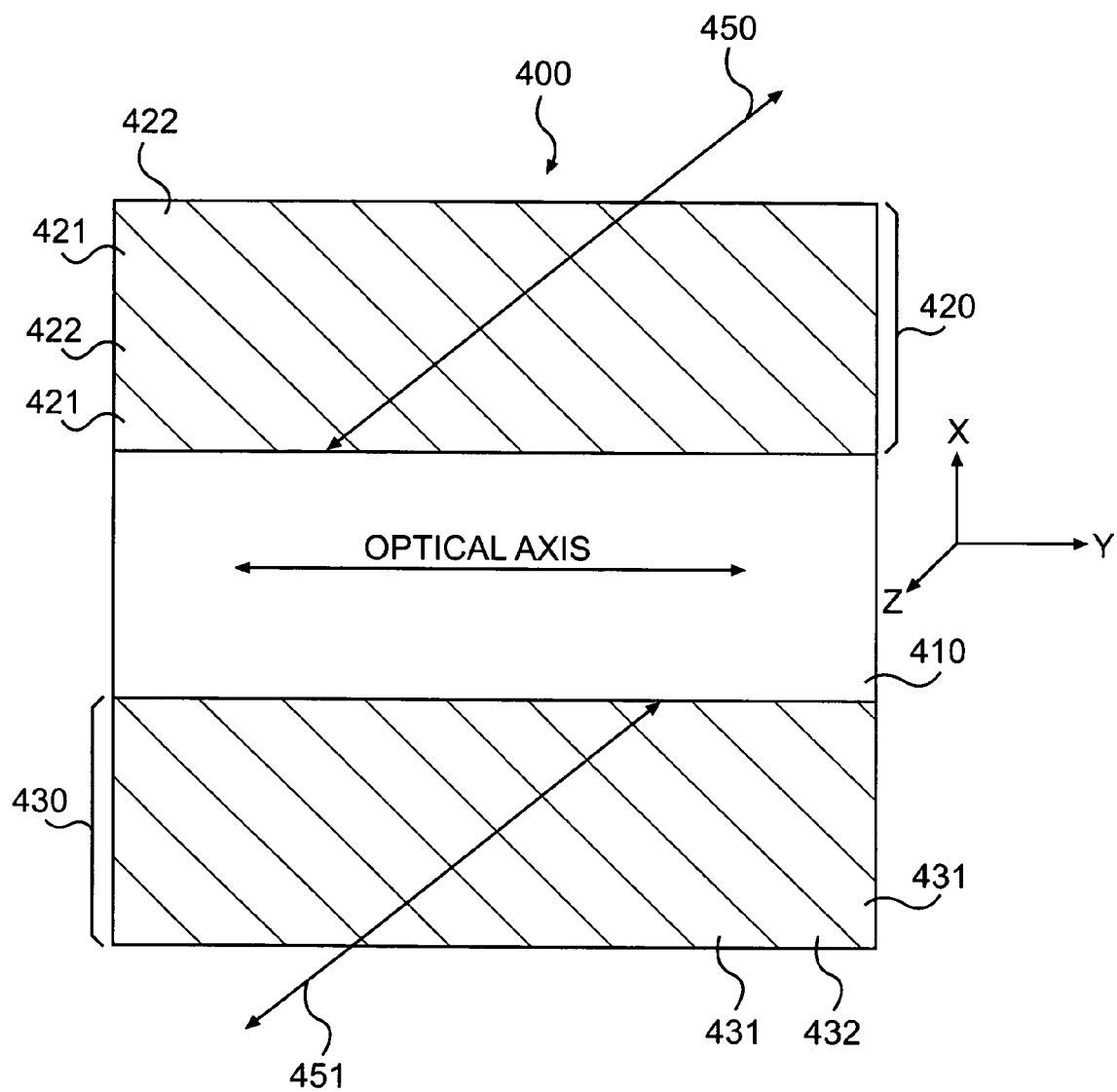
FIG. 4A depicts a top view of an exemplary Generalized Transverse Bragg Waveguide (GTBW) in accordance with the present teachings.
Figure 4B:
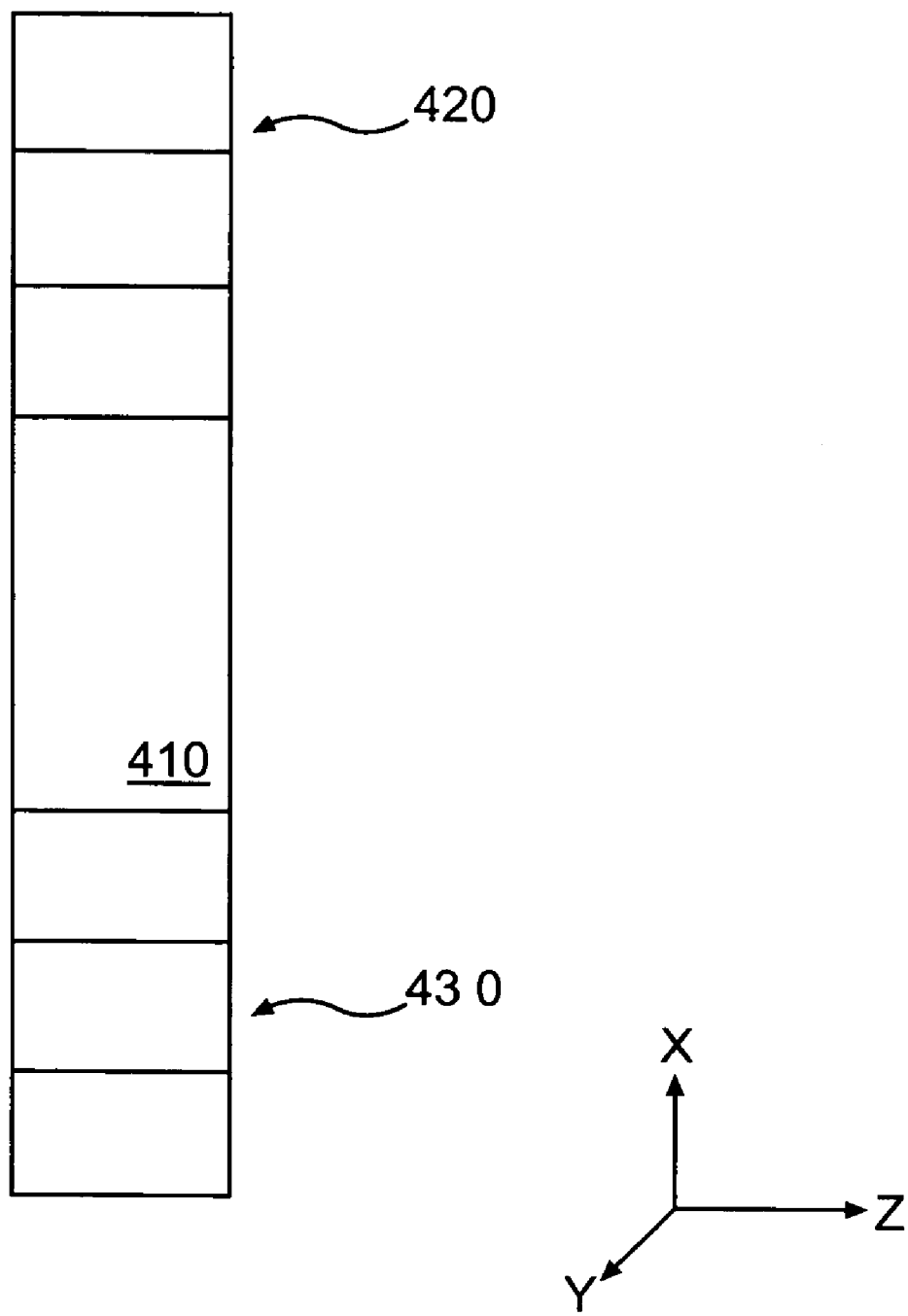
FIG. 4B depicts a side view of the exemplary GTBW of FIG. 4A.

Referring to the side view of FIG. 4A, an exemplary GTBW is shown. A GTBW 400 can include dielectric core 410, a first cladding 420 disposed on a first side of dielectric core 410, and a second cladding 430 disposed on a second side of dielectric core 410. In FIG. 4A, the optical axis of GTBW 400 is parallel to the y-axis (the z-axis runs into and out of the page). According to various embodiments, dielectric core 410 can be formed of materials known to one of ordinary skill in the art and have a uniform index of refraction $n_1$. Referring to the end view of FIG. 4B, dielectric core 410 can also have a rectangular cross-section and be bound on a first side 440 and a second side 450 by a media having an index of $n_2$, where $n_2 < n_1$, such as, for example, air.

Referring again to FIG. 4A, first cladding 420 disposed on a first side of dielectric core 410 can include a first periodic spatially varying index of refraction. According to various embodiments, the periodic spatially varying index of refraction can be alternating layers of a first material 421 and a second material 422 having indicies of refractions $n_{c2}$ and $n_{c1}$, respectively. A direction 450 of the first periodic spatially varying index of refraction can be other than normal or parallel to the optical axis of GTBW 400.

Similarly, second cladding 430 disposed on a second side of dielectric core 410 can include a second periodic spatially varying index of refraction. According to various embodiments, the periodic spatially varying index of refraction can be alternating layers of third material 431 and fourth material 432 having index of refractions $n_{c4}$ and $n_{c3}$, respectively. In various embodiments, third material 431 can be the same as first material 421, and fourth material 432 can be the same as second material 422. A direction 451 of the second periodic spatially varying index of refraction can be other than normal or parallel to the y-axis, the optical axis of GTBW 400.

In various embodiments, the direction 450 of the first periodic spatially varying index of refraction and the direction 451 of the second can be substantially similar. Further, in various embodiments, the periodicity of the first periodic spatially varying index of refraction can be substantially similar or different to the periodicity of the second periodic spatially varying index of refraction. Moreover, in various embodiments the phase of the first periodic spatially varying index of refraction can be substantially similar or different to the phase of the second periodic spatially varying index of refraction. For example, the variation of the index of refraction along a core-cladding interface (e.g., dielectric core 410-first cladding 420 interface or dielectric core 410-seccond cladding 430 interface), can be written as a Fourier series $$\text{Index}(y) = \sum_n A_n \cos\left(\frac{2\pi}{d} y + \phi\right), \quad (1)$$

where d is the period of the variation along the y-axis, the $A_n$ are the Fourier coefficients, and $\phi$ is the phase of the pattern relative to an arbitrarily defined origin (y=0). Although the orientation of the GTBW 400 and the optical axis are depicted in FIG. 4A as parallel to the y-axis for purposes of illustration, one of skill in the art will understand that the y-axis is arbitrary and can refer to any direction in space.

In various embodiments, GTBW 400 can operate as a single mode waveguide. Increasing the waveguide width to gain larger mode volume in conventional total-internal reflection waveguides results in multimode guiding, and a reduction in beam quality. By decreasing the index contrast and increasing the thickness (e.g., increasing the number of pairs of material or periods of thickness variation) of first cladding 420 and second cladding 430, highly reflective Bragg reflection can be achieved only over an increasingly narrow range of angles. As a result, the width of GTBW 400 can be increased by a factor of 10 or more over conventional total internal reflection waveguides without supporting additional modes.

Figure 5A:
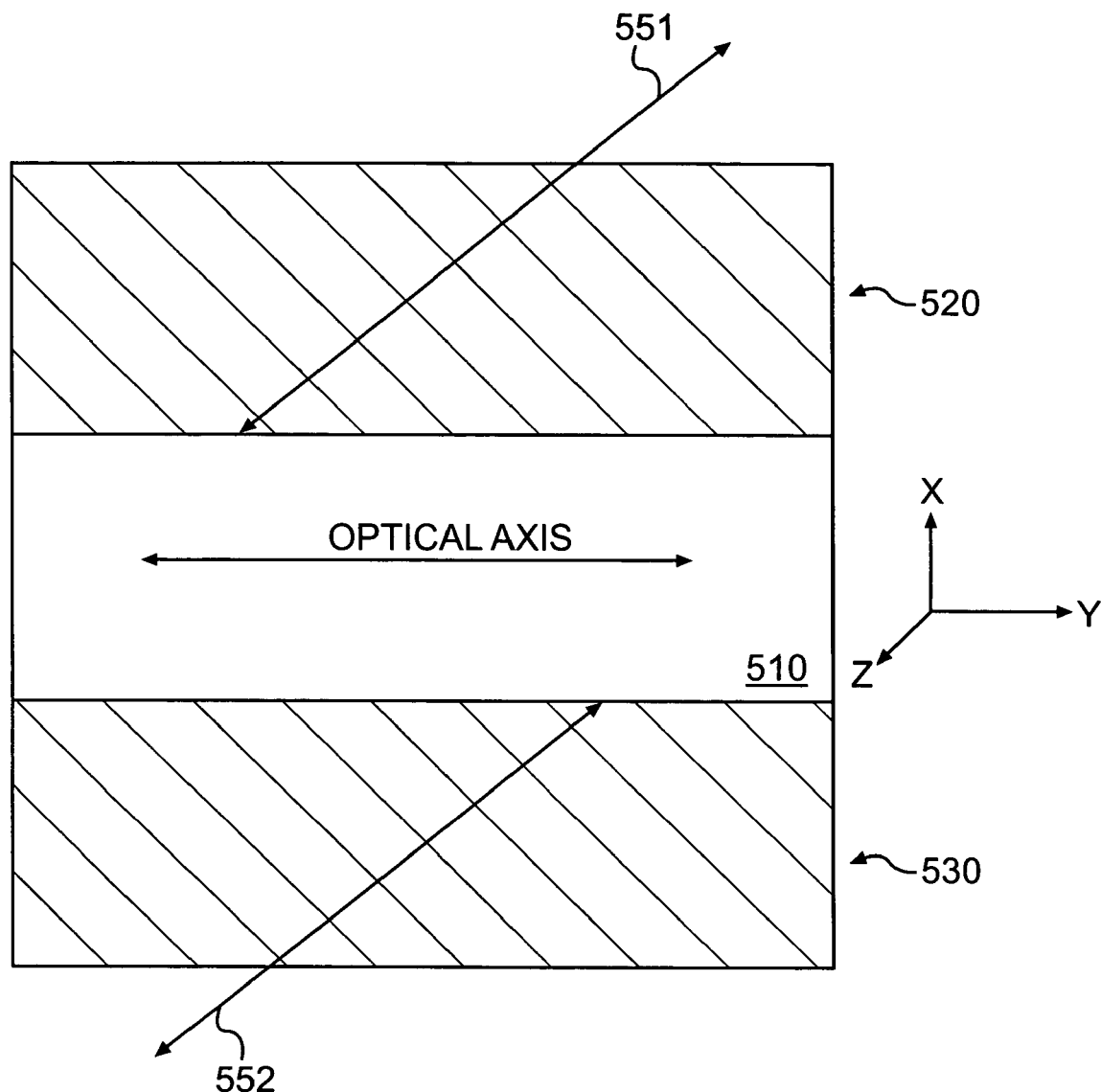
FIG. 5A depicts a top view of another exemplary Generalized Transverse Bragg Waveguide (GTBW) in accordance with the present teachings.
Figure 5B:
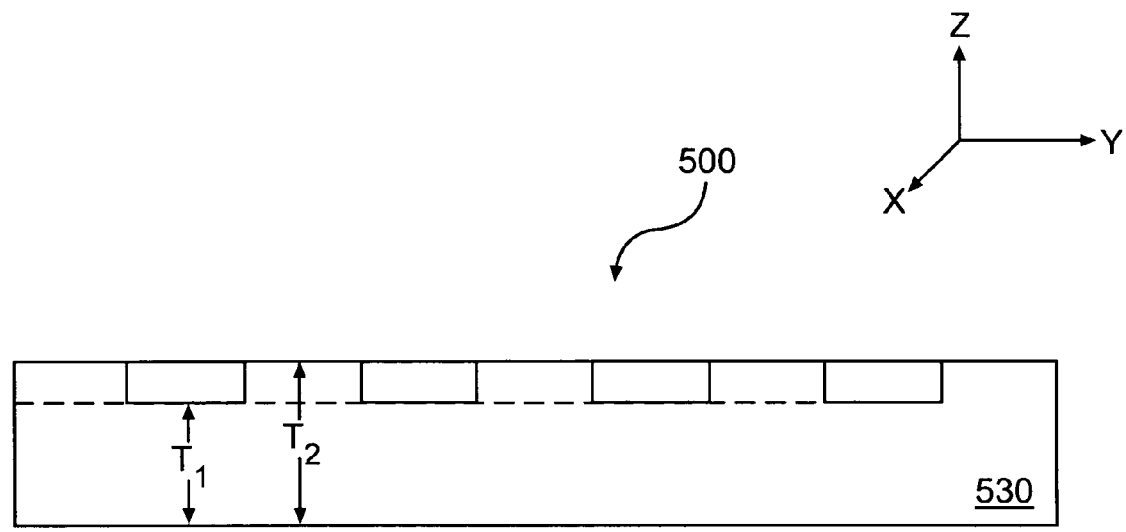
FIG. 5B depicts a side view of the exemplary Generalized Transverse Bragg Waveguide (GTBW) of FIG. 5A in accordance with the present teachings.
Figure 5C:
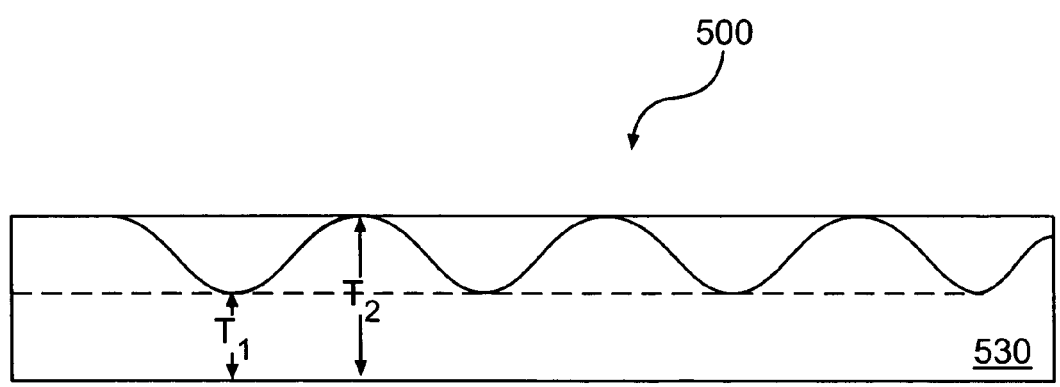
FIG. 5C depicts a side view of another exemplary Generalized Transverse Bragg Waveguide (GTBW) in accordance with the present teachings.

Referring to FIG. 5A-C, other exemplary GTBWs are shown. FIG. 5A depicts a top view of a GTBW 500 including a dielectric core 510, a first cladding 520 disposed on a first side of dielectric core 510, and a second cladding 530 disposed on a second side of dielectric core 510. Dielectric core 510 can be formed of materials known to one of ordinary skill in the art and have a uniform index of refraction $n_1$. As shown in FIG. 5A, the optical axis of GTBW 500 is parallel to the y-axis (the z-axis runs into and out of the page). Dielectric core 510 can be further bound on the top and the bottom by a media having an index of $n_2$, where $n_2<n_1$, such as, for example, air.

According to various embodiments, first cladding 520 and/or second cladding 530 can include a periodic variation in thickness. FIG. 5B is a side view that depicts the thickness of second cladding 530 periodically varying from $t_1$ to $t_2$. A direction of the periodic variation in thickness 552 can be at an angle other than normal or parallel to the optical axis of GTBW 500. First cladding 520 can also include a periodic variation in thickness from $t_1$ to $t_2$. A direction of the periodic variation in thickness 551 can be at an angle other than normal or parallel to the optical axis of GTBW 500.

The embodiment depicted in FIG. 5B includes a step-like periodic variation in thickness of first cladding 520 and/or second cladding 530. In other words, the thickness of first cladding 520 and/or second cladding 530 is either $t_1$ or $t_2$. According to various other embodiments, the periodic variation in thickness of first cladding 520 and/or second cladding 530 can vary between $t_1$ and $t_2$. As shown in the side view of FIG. 5C, second cladding 530 can have a periodically varying thickness that continuously varies between $t_1$ and $t_2$. Similarly, first cladding 520 can also have a periodically varying thickness that continuously varies between $t_1$ and $t_2$.

Figure 6A:
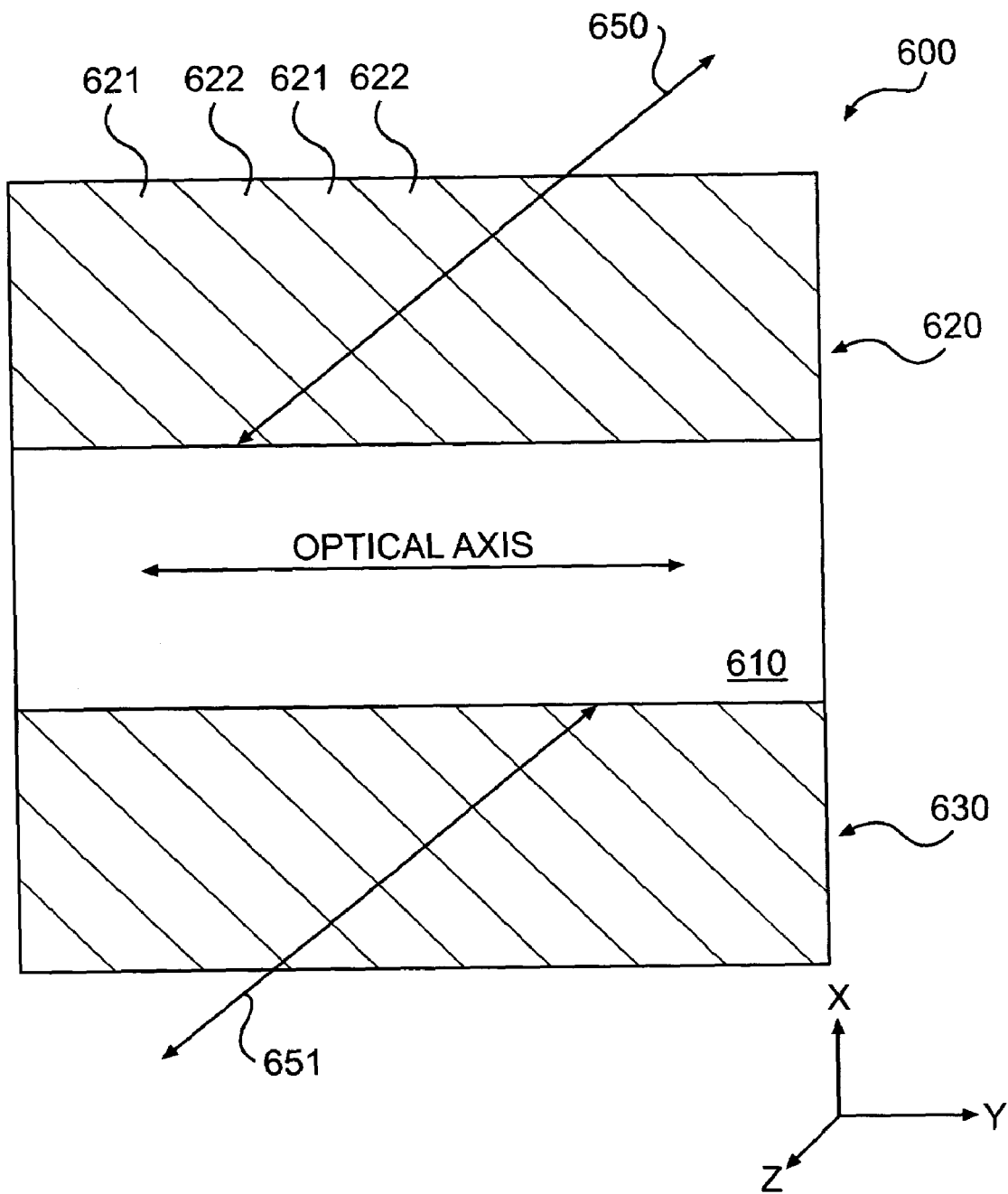
FIG. 6A depicts a top view of another exemplary Generalized Transverse Bragg Waveguide (GTBW) in accordance with the present teachings.
Figure 6B:
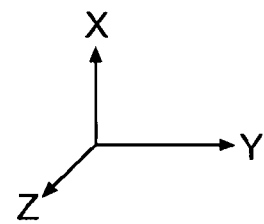
FIG. 6B depicts a side view of the Generalized Transverse Bragg Waveguide (GTBW) depicted in FIG. 6A in accordance with the present teachings.
Figure 6B:
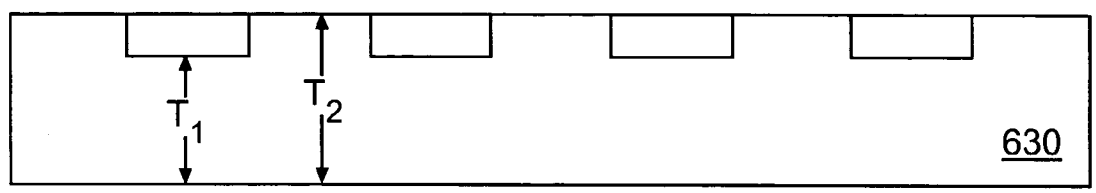
Figure 6C:
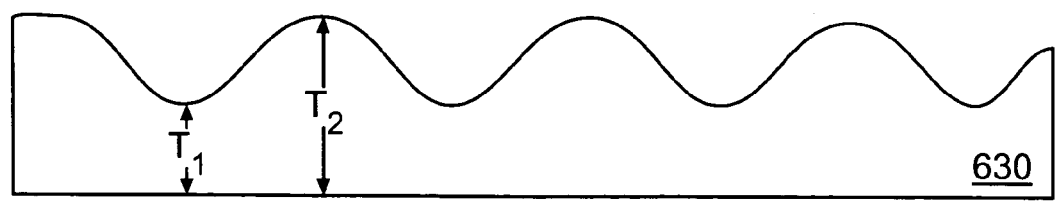
FIG. 6C depicts a side view of another exemplary Generalized Transverse Bragg Waveguide (GTBW) in accordance with the present teachings.

FIGS. 6A-C depict a top view of another exemplary embodiment of a GTBW in accordance with the present teachings. A GTBW 600 can include a dielectric core 610, a first cladding 620 disposed on a first side of dielectric core 610, and a second cladding 630 disposed on a second side of dielectric core 610. Dielectric core 610 can be formed of materials known to one of ordinary skill in the art and have a uniform index of refraction $n_1$. As shown in FIG. 6A, the optical axis of GTBW 600 is parallel to the y-axis (the z-axis runs into and out of the page). Dielectric core 610 can be further bound on the top and the bottom by a media having an index of $n_2$, where $n_2<n_1$, such as, for example, air.

First cladding 620 disposed on the first side of dielectric core 610 can include a first periodic spatially varying index of refraction. According to various embodiments, the periodic spatially varying index of refraction can be alternating layers of a first material 621 and a second material 622 having index of refractions $n_2$ and $n_1$, respectively. A direction 650 of the first periodic spatially varying index of refraction can be other than normal or parallel to the optical axis of GTBW 600.

Figure 3:
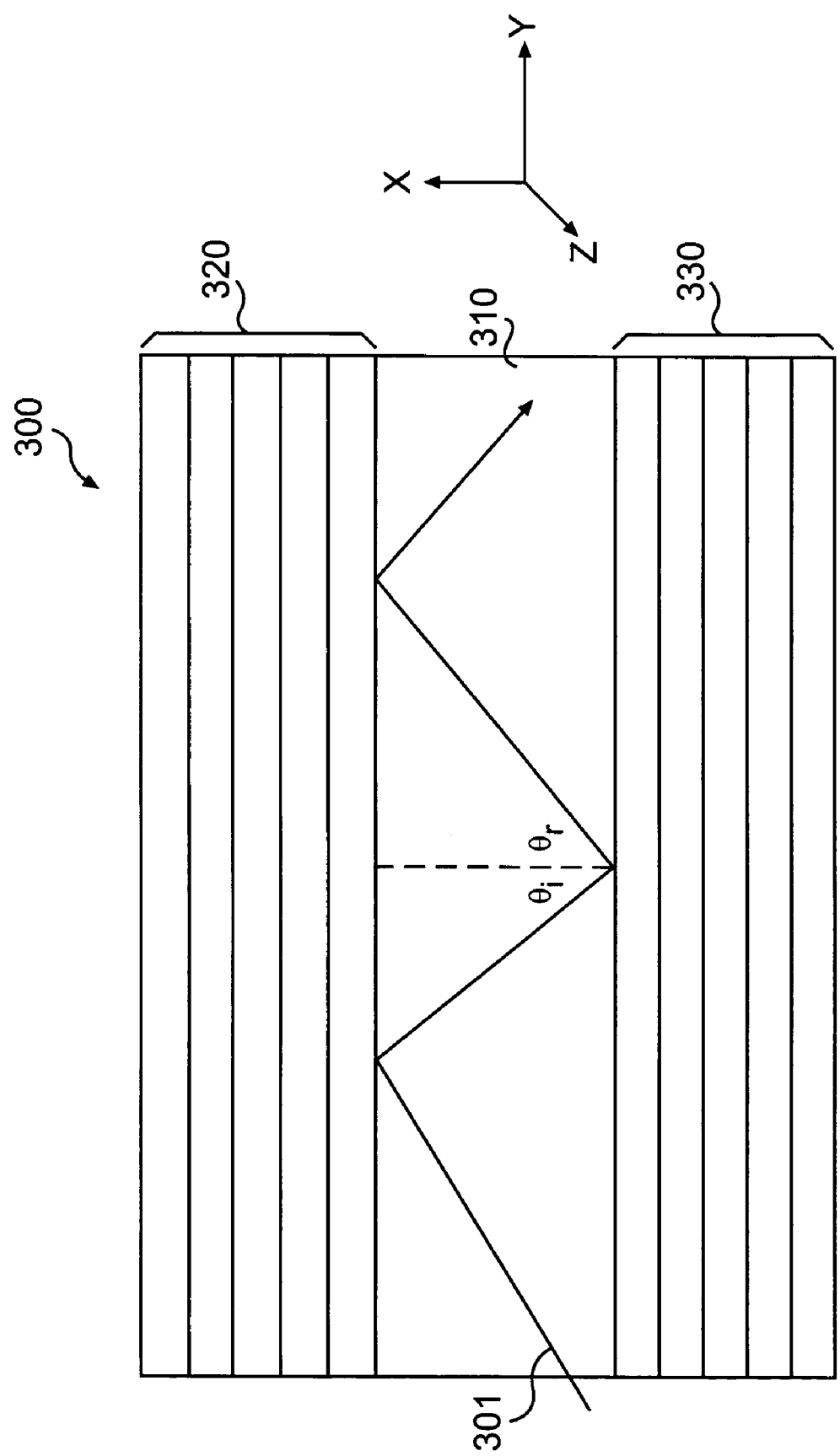
FIG. 3 depicts a top view of a prior art transverse Bragg waveguide.

Second cladding 630 can include a periodic variation in thickness. As shown in the side view of FIG. 6B, the thickness of second cladding 630 can vary periodically in a step-like manner from $t_1$ and $t_2$. A direction of the periodic variation in thickness 651 can be at an angle other than normal or parallel to the optical axis of GTBW 600. According to various embodiments, direction 650 can be parallel to direction 651. The thickness of second cladding 630 can also vary periodically in a continuous manner between $t_1$ and $t_2$, as shown in FIG. 3C. One of ordinary skill in the art will understand that other embodiments are contemplated that include first cladding 620, comprising alternating layers of first material 621 and second material 622, disposed on a bottom surface of core 610 and second cladding 630, comprising a periodic variation in thickness, disposed on a top surface of core 610.

Figure 7:
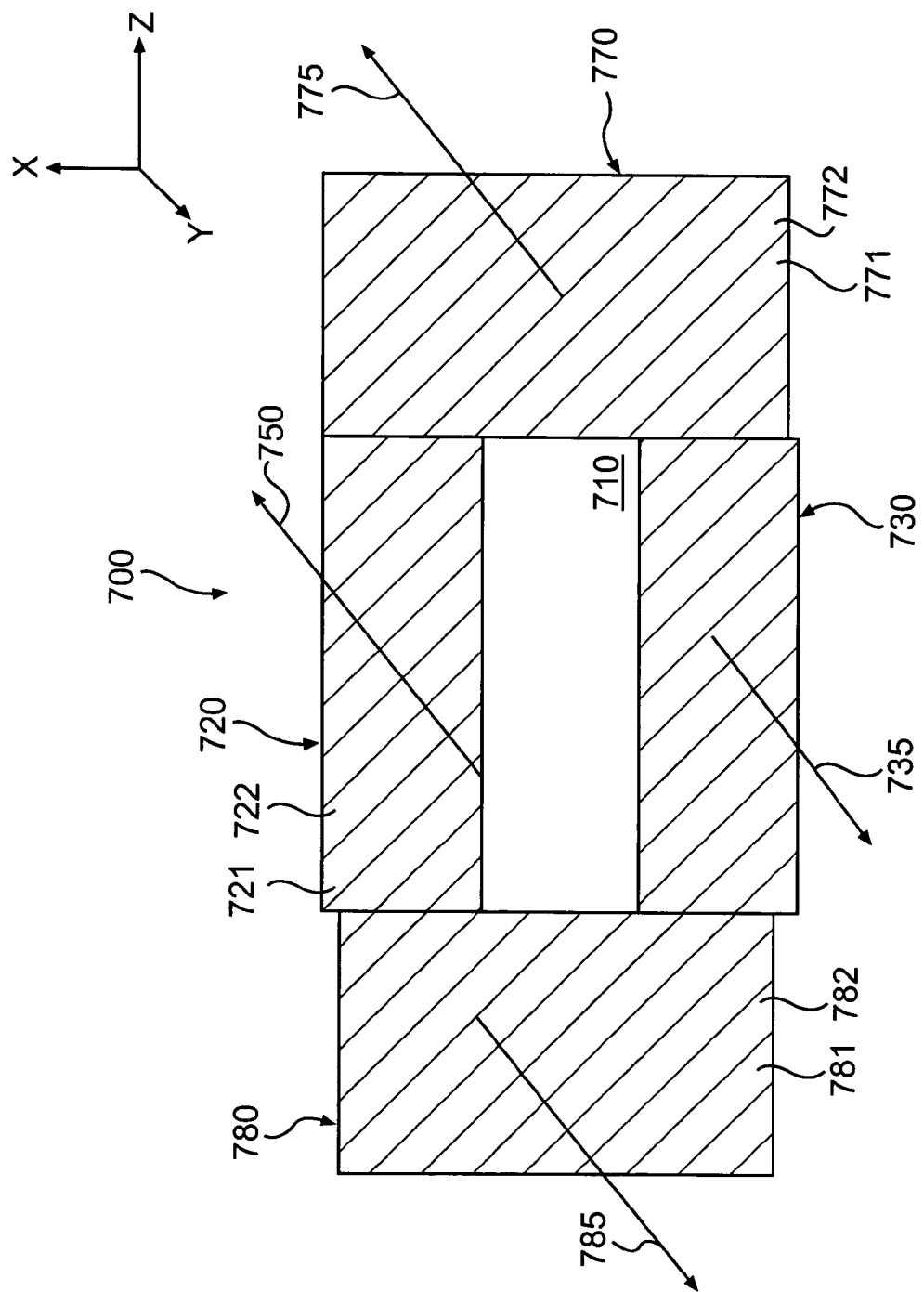
FIG. 7 depicts an end view of an exemplary Generalized Transverse Bragg Waveguide (GTBW) in accordance with the present teachings.

Referring to the end view of FIG. 7, another exemplary GTBW is shown. A GTBW 700 can include a dielectric core 710, a first cladding 720 disposed on a top surface of dielectric core 710, a second cladding 730 disposed on a bottom surface of dielectric core 710, a third cladding 770 disposed on a first side of dielectric core 710, and a fourth cladding 780 disposed on a second side of dielectric core 710. The optical axis of GTBW 700 is parallel to the y-axis (the y-axis runs into and out of the page). Dielectric core 710 can be formed of materials known to one of ordinary skill in the art and have a uniform index of refraction $n_1$. Third cladding 770 and fourth cladding 780 are depicted as extending beyond the top and bottom edges of core 710. One of ordinary skill in the art will understand that in another embodiment, first cladding 720 and second cladding 730 can extend past the sides of core 710 instead.

First cladding 720 can include a periodic spatially varying index of refraction. According to various embodiments, the periodic spatially varying index of refraction can be alternating layers of a first material 721 and a second material 722 having index of refractions $n_{c2}$ and $n_{c1}$, respectively. A direction 750 of the periodic spatially varying index of refraction of first cladding 720 can be other than normal or parallel to the optical axis of GTBW 700. Similarly, second cladding 730 can include a periodic spatially varying index of refraction. According to various embodiments, the periodic spatially varying index of refraction can be alternating layers of a third material 731 and a fourth material 732 having index of refractions $n_{c3}$ and $n_{c4}$, respectively. According to various embodiments, third material 731 and fourth material 732 can be the same as first material 721 and second material 722, respectively. A direction 735 of the second periodic spatially varying index of refraction of second cladding 730 can be other than normal or parallel to the optical axis of GTBW 700. In various embodiments, direction 735 can be parallel to direction 750.

Third cladding 770 can also include a periodic spatially varying index of refraction. According to various embodiments, the periodic spatially varying index of refraction can be alternating layers of a fifth material 771 and a sixth material 772 having index of refractions $n_{c5}$ and $n_{c6}$, respectively. A direction 775 of the periodic spatially varying index of refraction can be other than normal or parallel to the optical axis of GTBW 700. In various embodiments the direction 775 can be parallel to direction 750 and/or 735. Similarly, fourth cladding 780 can include a periodic spatially varying index of refraction. According to various embodiments, the periodic spatially varying index of refraction can be alternating layers of a seventh material 781 and a eighth material 782 having index of refractions $n_2$ and $n_1$, respectively. According to various embodiments, seventh material 781 and eighth material 782 can be the same as fifth material 771 and sixth material 772, respectively. A direction 785 of the periodic spatially varying index of refraction of fourth cladding 780 can be other than normal or parallel to the optical axis of GTBW 700. In various embodiments, direction 785 can be parallel to direction 775.

According to other embodiments, one or more of first cladding 720, second cladding 730, third cladding 770, and fourth cladding 780 can comprise a periodic variation in thickness to achieve the periodic spatial variation in refractive index as illustrated, for example, in FIGS. 6B-C. The direction of the periodic variation in thickness can be other than normal or parallel to the optical axis of waveguide 700.

Figure 8:
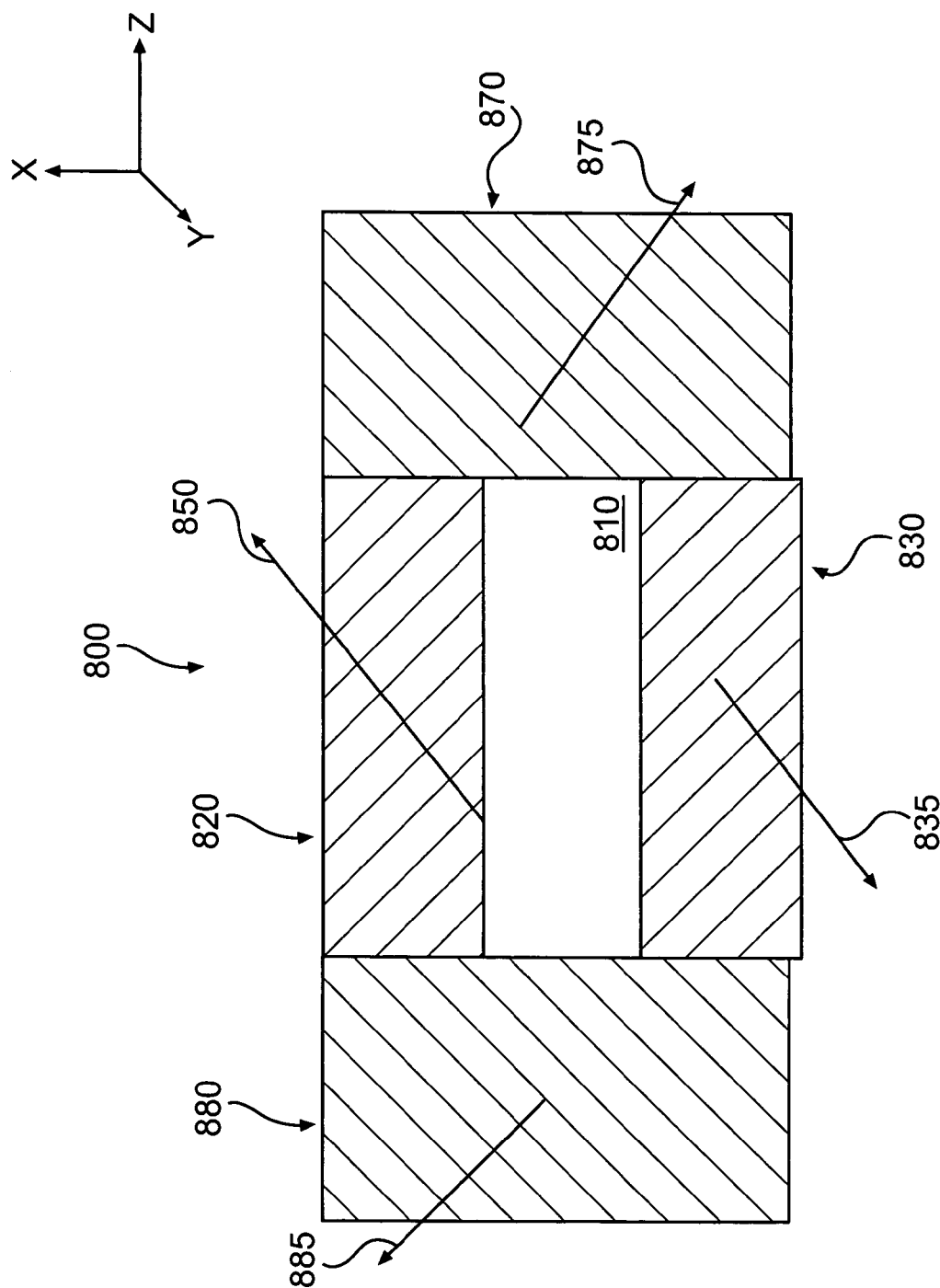
FIG. 8 depicts an end view of another exemplary Generalized Transverse Bragg Waveguide (GTBW) in accordance with the present teachings.

FIG. 8 depicts another exemplary embodiment of a GTBW. A GTBW 800 can be similar to GTBW 700 shown in FIG. 7, except for the orientation of the cladding layers. GTBW 800 can include a dielectric core 810, a first cladding 820 disposed on a top surface of dielectric core 810, a second cladding 830 disposed on a bottom surface of dielectric core 810, a third cladding 870 disposed on a first side of dielectric core 810, and a fourth cladding 880 disposed on a second side of dielectric core 810. As shown in the end view of FIG. 8, the optical axis of GTBW 800 is parallel to the y-axis (the y-axis runs into and out of the page).

First cladding 820, second cladding 830, third cladding 870, and fourth cladding 880 can be similar to first cladding 720, second cladding 730, third cladding 770, and fourth cladding 780 shown in FIG. 7, except for the orientation of third cladding 870 and fourth cladding 880. In various embodiments, a direction 875 of the periodic spatially varying index of refraction of third cladding 780 can be other than normal or parallel to the optical axis of GTBW 800 and be other than parallel to a direction 850 of the periodic spatially varying index of refraction of first cladding 820. A direction 885 of the periodic spatially varying index of refraction of fourth cladding 880 can also be other than normal or parallel to the optical axis of GTBW 800 and be other than parallel to a direction 850 of the periodic spatially varying index of refraction of first cladding 820. Further, one or both directions 875 and 885 can be other than parallel to a direction 835 of the periodic spatially varying index of refraction of second cladding 830. Third cladding 870 and fourth cladding 880 are depicted as extending beyond the top and bottom edges of core 810. One of ordinary skill in the art will understand that in another embodiment, first cladding 820 and second cladding 830 can extend past the sides of core 810 instead.

According to other embodiments, one or more of first cladding 820, second cladding 830, third cladding 870, and fourth cladding 880 can comprise a periodic variation in thickness to achieve the periodic spatial variation in refractive index as illustrated, for example, in FIGS. 6B-C.

Methods for using the exemplary GTBWs and method for making the exemplary GTBWs are also contemplated as disclosed in U.S. Provisional Patent Application Ser. No. 60/612,185 filed on Sep. 23, 2004, the disclosure of which is incorporated in its entirety by reference herein.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

As used herein, the term "one or more of" with respect to a listing of items such as, for example, A and B, means A alone, B alone, or A and B.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical waveguide comprising:
a dielectric core having an index of refraction $n_1$ and an optical axis;

a media having an index of refraction $n_2$ bounding a top surface and a bottom surface of the dielectric core, wherein $n_2<n_1$;

a first dielectric cladding bounding a first side of the dielectric core, wherein the first dielectric cladding has a first periodic spatially varying index of refraction; and a second dielectric cladding bounding a second side of the dielectric core, wherein the second dielectric cladding has a second periodic spatially varying index of refraction, and wherein a direction of the first periodic spatially varying index of refraction and a direction of the second periodic spatially varying index of refraction are at an angle other than normal or parallel to the optical axis.

2. The optical waveguide of claim 1, wherein a periodicity of the first periodic spatially varying index of refraction is substantially similar to a periodicity of the second periodic spatially varying index of refraction.

3. The optical waveguide of claim 1, wherein at least one of the first cladding and the second cladding comprises a first material having a first index of refraction periodically alternating with a second material having a second index of refraction.

4. The optical waveguide of claim 1, wherein at least one of the first cladding and the second cladding comprises a first material having a periodic variation in thickness.

5. The optical waveguide of claim 1, wherein one of the first cladding and the second cladding comprises a first material having a periodic variation in thickness and the other of the first cladding and the second cladding comprises a first material having a first index of refraction periodically alternating with a second material having a second index of refraction.

6. The optical waveguide of claim 1, wherein a phase of the first periodic spatially varying index of refraction is not equal to a phase of the second periodic spatially varying index of refraction.

7. The optical waveguide of claim 1, wherein a periodicity of the first periodic spatially varying index of refraction is different from a periodicity of the second periodic spatially varying index of refraction.

8. The optical waveguide of claim 1, wherein the optical waveguide is a single mode optical waveguide.

9. The optical waveguide of claim 1, wherein at least one of the first periodic spatially varying index of refraction and the second periodic spatially varying index of refraction varies in one dimension.

10. The optical waveguide of claim 1, wherein at least one of the first periodic spatially varying index of refraction and the second periodic spatially varying index of refraction varies in two dimensions.

11. An optical waveguide comprising:

a dielectric core having a uniform index of refraction along an optical axis;

a first dielectric cladding bounding a top surface of the dielectric core, wherein the first dielectric cladding has a first periodic spatially varying index of refraction;

a second dielectric cladding bounding a bottom surface of the dielectric core, wherein the second dielectric cladding has a second periodic spatially varying index of refraction;

a third dielectric cladding bounding a first side of the dielectric core, wherein the third dielectric cladding has a third periodic spatially varying index of refraction; and a fourth dielectric cladding bounding a second side of the dielectric core, wherein the fourth dielectric cladding has a fourth periodic spatially varying index of refraction, and wherein a direction of the first, second, third, and fourth periodic spatially varying index of refractions are at an angle other than normal or parallel to the optical axis.

12. The optical waveguide of claim 11, wherein a Bragg angle at an interface between the dielectric core and the first cladding, an interface between the dielectric core and the second cladding, an interface between the dielectric core and the third cladding, and an interface between the dielectric core and the fourth cladding are substantially similar.

13. The optical waveguide of claim 11, wherein a periodicity of the first, the second, the third, and the fourth periodic spatially varying index of refractions are substantially similar.

14. The optical waveguide of claim 11, wherein a periodicity of two of the first, the second, the third, and the fourth periodic spatially varying index of refractions are substantially similar.

15. The optical waveguide of claim 11, wherein the angles formed by the direction of the first and the second spatially varying index of refraction relative to the optical axis are substantially similar, and wherein the angles formed by the direction of the third and the fourth periodic spatially varying index of refraction relative to the optical axis are substantially similar.

16. The optical waveguide of claim 11, wherein at least one of the first, the second, the third, and the fourth dielectric claddings comprises a first material having a first index of refraction periodically alternating with a second material having a second index of refraction.

17. The optical waveguide of claim 11, wherein at least one of the first, the second, the third, and the fourth claddings comprises a first material having a periodic variation in thickness.

18. The optical waveguide of claim 11, wherein at least one of the first, the second, the third, and the fourth claddings comprises a first material having a periodic variation in thickness and wherein at least one of the first, the second, the third, and the fourth claddings comprises a first material having a first index of refraction periodically alternating with a second material having a second index of refraction.

19. The optical waveguide of claim 18, wherein the direction of the periodic spatially varying index of refraction of the first, the second, the third, and the fourth dielectric cladding are substantially similar, and wherein a phase of the periodic spatially varying index of refraction of the first, the second, the third, and the fourth dielectric cladding are not substantially similar.

20. The optical waveguide of claim 11, wherein the direction of the periodic spatially varying index of refraction of the first, the second, the third, and the fourth dielectric claddings are different, and wherein a periodicity of the periodic spatially varying index of refraction of the first, the second, the third, and the fourth dielectric claddings are different.

* * * * *

UNITED STATES PATENT AND TRADEMARK OFFICE
CERTIFICATE OF CORRECTION

PATENT NO. : 7,327,924 B2  Page 1 of 1
APPLICATION NO. : 11/231812
DATED : February 5, 2008
INVENTOR(S) : Steven R. J. Brueck and David B. Burckel It is certified that error appears in the above-identified patent and that said Letters Patent is hereby corrected as shown below:

Please insert the following paragraph in Column 1, line 11:

--GOVERNMENT INTEREST

This invention was made with government support under Contract DAAD19-99-1-0196 awarded by the Army Research Office. The government has certain rights in the invention.--

Signed and Sealed this

Third Day of March, 2009

JOHN DOLL
*Acting Director of the United States Patent and Trademark Office*